Oct. 25, 1938.    F. W. ZINK    2,134,016
REAR VIEW MIRROR SUPPORTING MEANS
Original Filed Dec. 14, 1936
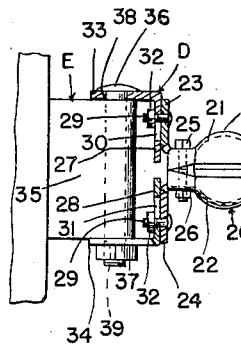
FIG.I.
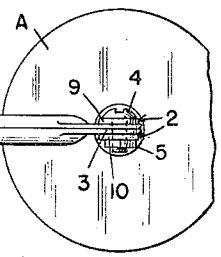
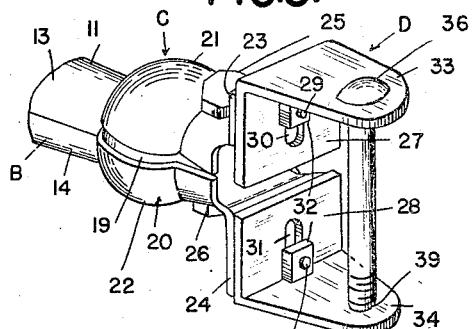
FIG.3.
FIG.5.
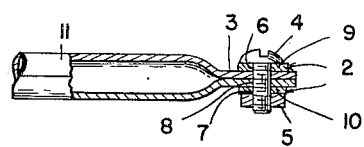
FIG.4.
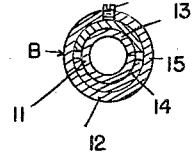
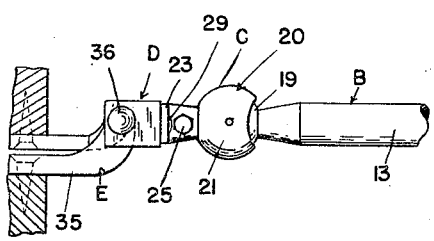
FIG.2.
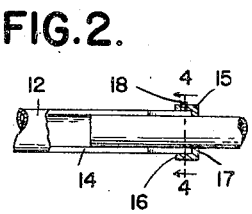
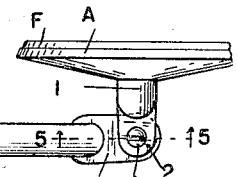
*INVENTOR*
FRED. W. ZINK
BY
*ATTORNEYS*

Patented Oct. 25, 1938

2,134,016

UNITED STATES PATENT OFFICE 2,134,016

REAR VIEW MIRROR SUPPORTING MEANS

Fred W. Zink, Detroit, Mich., assignor to Whitehead Stamping Company, Detroit, Mich., a corporation of Michigan Original application December 14, 1936, Serial No. 115,855. Divided and this application May 3, 1937, Serial No. 140,487

5 Claims. (Cl. 248—276)

This invention relates generally to rear view mirror supporting means and constitutes a division of my application filed December 14, 1936, bearing Serial No. 115,855.

One of the essential objects of the invention is to provide a supporting means of this type wherein provision is made for adjusting a mirror about an axis substantially at right angles to the axis of a supporting arm and for universal adjustment of said arm relative to a supporting bracket.

Another object is to provide a mirror supporting means wherein provision is made for adjustably mounting the supporting bracket upon a suitable fixture attachable to a door hinge and the like.

Another object is to provide a mirror supporting means wherein the fixture referred to is itself adjustable to engage door hinges of various sizes.

Another object is to provide a mirror supporting means that is relatively simple in construction, comparatively inexpensive to manufacture, and that can be easily and quickly installed.

Other objects, advantages and novel details of construction of this invention will be made more apparent as this description proceeds, especially when considered in connection with the accompanying drawing, wherein:

Figure 1 is a rear elevation of a mirror supporting means embodying my invention, with parts broken away and in section;

Figure 2 is a top plan view of the construction shown in Figure 1;

Figure 3 is an enlarged fragmentary perspective view thereof;

Figure 4 is a cross sectional view taken substantially on the line 4—4 of Figure 2;

Figure 5 is a sectional view taken substantially on the line 5—5 of Figure 2.

Referring now to the drawing, A is the mirror holder, B is the supporting arm, C is the supporting bracket, and D is the fixture attachable to a door hinge such as E.

As shown, the holder A carries a suitable mirror F and is provided at the back thereof with a relatively short arm 1 having a bifurcated portion 2 straddling and pivotally connected to a flattened end portion 3 of the arm B. Preferably the pivotal connection between the holder A and arm B comprises a bolt 4 and nut 5. The bolt 4 extends through aligned openings 6, 7 and 8, respectively, in the flattened portion 3 of the arm B and the furcations 9 and 10, respectively, of the arm 1, so that the mirror holder A is adjustable about an axis extending at substantially right angles to the axis of the arm B, and is held in adjusted position by the nut 5.

The arm B is extensible to vary the distance between the holder A and hinge E and preferably comprises two telescopically engaging tubular members 11 and 12 of sheet metal. The member 11 fits within the member 12 and is formed by rolling or otherwise fashioning a stamping to impart a tubular cross section thereto of a dimension to have a sliding fit within the member 12. Preferably the member 12 is formed of two complementary sheet metal stampings 13 and 14 that are held in assembled relation to each other at the inner ends thereof by means of a stamping 15 in the form of a collar having an annular portion 16 encircling the inner ends of the sheet metal stampings 13 and 14 and having a flange 17 extending radially inwardly beyond said inner ends into engagement with the member 11. A set screw 18 is carried by the stamping 15 and is adapted to cooperate with said stamping to frictionally grip the cooperating stampings 13 and 14 upon the member 11. Thus, the set screw 18 and stamping 15 frictionally holds the member 11 from axial sliding movement as well as from rotation relative to the member 12. Upon loosening the set screw 18, the member 11 may be either rotated relative to the member 12 to change the angle of reflection of the mirror or may be moved axially relative to the member 12 to vary the distance between the mirror and the hinge.

To provide universal adjustment between the arm B and the bracket C, the stampings 13 and 14 are fashioned to cooperate with each other in forming a spherically shaped portion 19 of sufficient dimension to be received within a correspondingly shaped socket portion 20 of the bracket C. Preferably the bracket C is also formed of two complementary sheet metal stampings 21 and 22 fashioned to cooperate with each other in forming the socket 20 and having vertical flanges 23 and 24, respectively, for attachment to the fixture D. Any suitable means such as the clamping bolt 25 and nut 26 may be employed between the socket 20 and the flanges 23—24 for frictionally holding the spherically shaped portion 19 of the arm B in adjusted position in the socket portion 20 of the bracket C.

Preferably the vertical flanges 23—24 of the bracket C are adjustably mounted upon vertical flanges 27—28 by means of bolts 29 carried by the flanges 23—24 and extending through vertical slots 30—31 in the vertical flanges 27—28 and threaded for engagement with the clamping nuts 32. Inasmuch as the slots 30—31 are elongated in a vertical direction, it is apparent that the distance between the horizontal portions 33—34 of the fixture D may be varied to compensate for hinges of various sizes. In practice, the usual hinge pintle carried by the fixed part 35 of the hinge E is replaced by a bolt 36 and nut 37. As shown, the horizontal portions 33—34 of the fixture engage the top and bottom of the hinge E and have aligned openings 38 and 39 for receiving the bolt 36.

What I claim as my invention is:

1. Mirror supporting means comprising a two-piece fixture attachable to a hinge, one portion of each piece having an opening for receiving a hinge pintle, said pieces having substantially aligned portions, a bracket having a bolt and slot connection with each aligned portion, and a mirror-carrying arm having a ball and socket connection with said bracket.

2. Mirror supporting means comprising a pair of cooperating angle plates having relatively movable substantially parallel portions spaced apart to receive therebetween the fixed and movable parts of a hinge and apertured to receive a bolt connecting said parts together, said plates having substantially aligned portions provided with elongated slots, a bracket having substantially aligned portions slidably engaging the aligned portions of said angle plates, and fastening elements carried by the aligned portions of the bracket and engaging the elongated slots in the aligned portions of said angle plates.

3. Mirror supporting means comprising a fixture having relatively movable substantially parallel portions spaced apart to receive therebetween the fixed and movable parts of a hinge and apertured to receive a bolt connecting said parts together, said fixture having substantially aligned portions provided with elongated slots, a bracket having substantially aligned portions slidably engaging the aligned portions of said fixture, and fastening elements carried by the aligned portions of the bracket and engaging the elongated slots in the aligned portions of said fixture.

4. Mirror supporting means comprising two cooperating mounting members having portions apertured to receive a hinge pintle and having spaced substantially vertically aligned portions, and a mirror supporting bracket secured to and spanning the space between said portion, said bracket being slidable lengthwise of the vertically spaced portions of said mounting members.

5. Mirror supporting means comprising two cooperating mounting members having substantially horizontal portions apertured to receive a hinge pintle and having spaced substantially vertical portions, and a mirror supporting bracket spanning the space between and having a bolt and slot connection with the spaced vertical portions of said members.

FRED W. ZINK.